United States Patent [19]

Ferrari

[11] 3,911,136

[45] Oct. 7, 1975

[54] 1-(O-METHOXY-PHENOXY)-3-ISOPROPYL-AMINO-PROPANE-2-OL HCL AND NITROGLYCERINE CORONARY INSUFFICIENCY COMPOSITION

[75] Inventor: Giorgio Ferrari, Milan, Italy

[73] Assignee: Simes Societa Italiana Medicinali e Sintetici S.p.A., Milan, Italy

[22] Filed: May 1, 1974

[21] Appl. No.: 466,056

[52] U.S. Cl. .............................. 424/298; 424/330
[51] Int. Cl.² ................ A61K 31/21; A61K 31/135
[58] Field of Search ........................... 424/330, 298

[56] References Cited
OTHER PUBLICATIONS
Merck Index, 8th Edition, 1968, p. 739.
Merck Index, 8th Edition, 1968, p. 875.

Primary Examiner—Albert T. Meyers
Assistant Examiner—Daren M. Stephens
Attorney, Agent, or Firm—Cushman, Darby & Cushman

[57] ABSTRACT

A pharmaceutical composition is disclosed for treating coronaric ailments, the composition containing an association of nitroglycerine with an inhibiting agent of the beta adrenergic receptors of myocardium. The preferred inhibitor is 1-(o-methoxy-phenoxy)-3-isopropyl-amino-propane-2-ol hydrochloride. The results of the treatment are outstandingly good.

2 Claims, No Drawings

1-(O-METHOXY-PHENOXY)-3-ISOPROPYL-AMINO-PROPANE-2-OL HCL AND NITROGLYCERINE CORONARY INSUFFICIENCY COMPOSITION

This invention relates to a pharmaceutical composition which is adapted for treating certain myocardial diseases.

More particularly the invention relates to the treatment of coronaric ailments by using a combination of medicaments, having different mechanisms of action but synergistic with one another also in the sense that each of the two drugs annuls the side- and undesirable effects of the other, so as to obtain an improved therapeutical result over the mere additive effect of the two drugs taken individually.

The invention relates, in addition, to a special pharmaceutical form which fractionally yields the combination in time. This parmaceutical form affords the possibility of maintaining the pharmacological effects of the two active principles for a time which is sufficiently long so as to obtain the advantage of administering the medicament at long time intervals with a considerable reliability in the prevention and treatment of the disease. This result is a particular advantage in the treatment of coronaric insufficiency, in which the patient is considerably exposed also to the emotional troubles which depend on the possibility of the sudden onset of an angina crisis.

It is well known long since to use compounds having a coronary vasodilating activity, among which a predominant importance has been acquired by, and still has, nitroglycerine whose action is prompt and efficient, as a consequence of a relaxing of the smooth muscles of the small blood vessels. This systemic and coronary vasodilation is conducive to a reduction of the vascular resistances and consequently to a reduced work for the heart and a reduced oxygen consumption by the myocardium.

Nitroglycerine acts within 2–3 minutes as from the administration and its effect lasts about 30 minutes Martindale, "The extrapharmacopoeia" XXVI, The Pharmaceutical Press, London 1972), pages 748–751). More particularly, it is recognized to nitroglycerine, as well as to amyl nitrate, the characteristic of a short-acting drug, that is for a first aid treatment rather than for use in compositions having a prolonged and retarded effect; Goodman-Gilman "The Pharmacological Basis of Therapeutics," MacMillan, 1970, 34, pages 745–751). In the cases where a prolonged effect is desired, resort is had to other compounds, the so-called long acting nitrates (e.g. Nitryl tetranitrate and others) which, however, do not attain the intensity of effect which is characteristic of nitroglycerine.

It is also known, for the treatment of angina conditions, to use beta-adrenergic receptor inhibiting agents (Martindale, loc.cit). It is known, in fact, that catecholamines increase the heart work and the oxygen consumption by the heart, and that many conditions which unleash an "angina pectoris" seizure also increase the activity of the sympathetic nervous system. On these bases, adrenergic beta-blocking drugs have been thoroughly studied in the treatment of angina pectoris with favourable results. Among these agents, one of the best known is 1-isopropylamino-3-(1naphthyloxy)-propane--naphthyloxy)-propane-2-ol, also known as propranolol. Pharmaceutical associations have also been attempted in the past for treating angina conditions, such association containing both a nitrite belonging to the long acting class (pentaeritritol tetranitrate, erityl tetranitrate and others) and a beta-adrenergic receptor inhibiting agent (British Pat. No. 1 213 211). Substantially, according to the teachings of this patent, the comparatively slight effect of the nitrites of the long acting class is integrated by the presence of the beta-adrenergic receptor inhibiting agent, whereas the secondary effects of the latter (vasoconstriction etc.) are balanced by the presence of the vasodilator.

Lastly, it should not be overlooked that the dosages of the beta-blocking agents should be contained within a restricted range to prevent the onset of side effects. As regards specifically the beta adrenergic receptor inhibiting agents, a compound is worth noting, that is, 1-(o-methoxy-phenoxy)-3-isopropylamino-2-propanol hydrochloride, which has been prepared and studied by the same Applicant (Arzneimittelforschung (Drug Res.) 20, 1074–1079, 1970) which in the pharmacological tests and clinical use has proven favourably to influence the savings in the oxygen consumption by myocardium to a degree which is greater than that of other adrenergic beta-blocking agents of the trade while having a negative inotropic effect, and thus heart-depressive, and a bronchial-constrictive effect lower than that of said agents.

Particularly significant results, according to what has been outlined above, have been obtained by associating with nitroglycerine appropriate dosages of the beta adrenergic receptor inhibiting agent of myocardium as identified above, inasmuch as, while the latter reduces the oxygen demand by myocardium, the former increases the oxygen feed to the inschaemic myocardium and, moreover, each of the two drugs balances the least desirable effects of the other, the coronaric vasoconstriction caused by the adrenergic beta-blocking agent, and the tachycardia caused by nitroglycerine.

In the preferred embodiment of the composition according to the invention there is used as the betablocking agent, 1-(o-methoxy-phenoxy)-3-isopropylamino-propane-2-ol hydrochloride which has the following specifications:

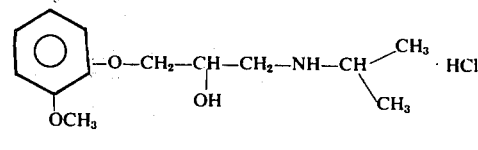

$=C_{13}H_{21}O_3N \cdot HCl$

Mol.wt 275,78 - Melting point 114–116°C
$= 272–274\ m\mu\ E^{1\%}_{1\ cm\ max} = 84$ C% = 56,61; H% = 8,04; N% = 5,08; Cl = 12,85

In the thin layer chromatography of 50 gamma of product, using as the solvent system: methylene chloride/methanol/water = 73:25:2 (migration time 30 minutes; eluant 0.1 N iodine a spot is observed at $R_f=0.69\pm0.02$.

It has been found that by associating appropriate dosages of 1-(o-methoxy-phenoxy)-3-isopropylamino-propan-2-ol hydrochloride and nitroglycerine very conspicuous pharmacological results are obtained, the result being a protection of the heart by the exceedingly high sympathetic stimulation and consequent reduction of its metabolic requirements, that which is accompanied, in addition, by a depression of the peripheral vasal tone and an indirect decrease of the heart work.

It has been found that the appropriate dosages for 1-(o-methoxy-phenoxy)-3-isopropylamino-propan-2-ol hydrochloride are comprised between 10 and 50 milligrams, whereas for nitroglycerine this is between 0.5 and 2.5 milligrams. Especially appropriate has been found, in practice, a ratio of the inhibiting substance to the organic nitroderivative of 10 to 1.

The clinical experience as conducted with the combination indicated above has confirmed the pharmacological assumptions showing that the product displays a reliable antistenocardiac effect and is an advantageous therapeutical treatment for the prevention and treatment of the coronaric insufficiency. The therapeutical effects are exhibited by the reduction or disappearance of the pain and a marked reduction in the frequency of the angina seizures.

Certain functional tests such as the Maser test or the cycloergometer tests confirm the result.

A particular aspect of the present invention lies in the special protracted action pharmaceutical formulation which can be prepared in the form of hard-gelatine capsules containing the granules with the two active principles in the dosage of 25 milligrams for the 1-(o-methoxy-phenoxy)-3-isopropylamino-propan-2-ol hydrochloride and 2.5 milligrams for nitroglycerine.

The preparation is carried out so as to obtain a gradual yield in time of the two active principles. It has been found advantageous, for example, a release, during the first hours as from the administration, of 20 percent of the inhibitor dosage which is present and of 30 percent of nitroglycerine. At the fourth hour, 75 percent of the inhibitor and 60 percent of nitroglycerine. At the eighth hour 100 percent of the inhibitor and 100 percent of nitroglycerine. A release of this kind is capable of assuring a thereapeutical effect for at least 12 hours. The formulation with delayed effect of the two active principles is obtained by using excipients which are adapted to permit the release of the active principles with the lapse of time.

These excipients, as processed with the appropriate methods together with the active principles comprise the polymers of esters of the methacrylic acid or colophony.

The following example illustrates the preparation of the composition according to the present invention and is in no way a limitation thereof.

EXAMPLE

Preparation of delayed action capsules

Each capsule contains:

| | |
|---|---|
| 1-(o-methoxy-phenoxy)-3-isopropylamino-propan-2-ol hydrochloride | 25 millig. |
| Nitroglycerine | 2.5 millig. |
| Sucrose | 207.4 millig. |
| Starch | 54.3 millig. |
| Stearic acid | 0.8 millig. |
| Polyvinyl pyrrolidone | 2.0 millig. |
| Methacrylic acid polymers | 2.3 millig. |
| Talc | 25.7 millig. |

In an appropriate machine, by centrifugal extrusion, microspheres are prepared using a hot dough of sucrose, starch and water.

The microspheres are dried in a hot air stream and then screened by collecting only those having a diameter corresponding to the 8-mesh size. In a confectionery bowl there is applied to a portion of the microspheres one of the two active principles supplemented by stearic acid, using a glueing solution prepared with water and a portion of polyvinylpyrrolidone. The microspheres are dried in a hot air stream. Subsequently, on the microspheres coated with the active principle there is applied the membrane for the controlled release of the active principle by treatment with a varnish prepared with the polymer of esters of methacrylic acid and talc. The release in time is a function of the number of layers of the varnish which are applied on the microspheres carrying the active principle. The application of the varnish is always made in the bowl by an appropriate spraying device.

The fraction of the microspheres which have been left deprived of varnish serves for the part of the composition which is to be released immediately.

A similar procedure is carried out on the part of granules of sucrose which has been proportionally set aside and is intended to incorporate nitroglycerine.

Once the granules have been obtained with the varnish applied which forms the controlled release membrane, the microgranules of each individual species are mixed with adjustments such as to obtain the following releases:

1. For 1-(o-methoxy-phenoxy)-3-isopropylamino-propan-2-ol at the first hour the 20 percent of the active principle, at the fourth hour the 75 percent; at the eighth hour the 100 percent.

2. For nitroglycerine at the first hour the 30 percent of the active principle; at the fourth hour the 60 percent and at the eighth hour the 100 percent.

Lastly, appropriate amounts of granules are admixed as under 1) and of those under 2) so that a mixture is obtained which, at the analysis, contains 25 milligrams of the active principle according to 1) and 2.5 milligrams of the active principle under 2). With such a mixture hard-gelatine capsules are filled of the No. 2 size. Each capsule contains 320 milligrams of granules.

As will become apparent from the pharmacological results reported in the following, the pharmaceutical composition according to the present invention is characterized by the presence of nitroglycerine, which has the highest and most efficient vasodilating activity associated with an elective inhibitor of the beta adrenergic receptor such as 1-(o-methoxy-phenoxy)-3-isopropylamino-2-propanol, which, as has been seen, has better properties than those of other adrenergic beta blocking agents. This association synergistic effects both potentiating as regards the savings of heart work, and of annulment as regards the vasoconstriction due to the adrenergic beta-blocking and the tachycardia as caused by nitroglycerine. As much important in the present invention is the pharmaceutical composition which permits the release, prolonged in time, of the association of the two drugs in optimum proportions. More particularly, short acting nitroglycerine is released by the formulation over a long period of time and at the appropriate dosages.

Under the pharmacological respect:

a. The acute and chronic toxicity data of nitroglycerine are well known in the literature and the dosages provided for in the present invention are comparatively very low and thus comprised within the safety limits.

b. For 1-(o-methoxyphenoxy)-3-isopropylamino-2-propanol there have been obtained the following values for acute toxicity:

| ANIMAL SPECIES | $LD_{50}$ mg/kg | |
|---|---|---|
| | i.v. | os |
| Mouse | 42(35 – 50) | 655 (526 – 695) |
| Rat | 67(62 – 72) | 2750 (1992 – 3795) |
| Guinea pig | — | 500 (429 – 840) |
| Rabbit | — | 450 | c. Pharmacodynamic tests have been carried out in order to ascertain:

1. The pharmacological activity of the individual components and that of the association. 2. The pharmacological activity of the individual components and that of same in long acting formulation. 3. The activity of 1-(o-methoxyphenoxy)-3-isopropylamino-propane-2-ol in the long acting formulation as compared with the association with nitroglycerine also in long acting formulation.

1 - In the dog, in anaesthesia and with open thorax there were evaluated by intravenous route the nitroglycerine (hereinafter indicated with A), 1-(o-methoxyphenoxy)-3-isopropylamino-propane-2-ol (hereinafter indicated with B), and the association of the two (hereinafter indicated at C) on the following parameters: heart frequency, average arterial pressure, average coronaric resistance and heart work (see Table 1). Under these test conditions, regrettably, it is not possible to detect the increase of the heart frequency as a result of the administration on nitroglycerine (A) since in the narcotized dog the same is already very high under basal conditions and it is very unlikely that it could be further increased as it happens in the awake animal. With the simultaneous presence of the beta-blocking agent (B) however, there is noted a reduction, which is highly significant, of the frequency on the heart work, reduced by 38 by nitroglycerine and by 14 percent by beta-adrenergic blocking agent, the association (C) has brought to a reduction by 66 percent, a value which is significantly higher than the sum of the activities of the two individual components.

TABLE I

Comparison of the activities of nitroglycerine, the beta-blocking agent and the association of the two products, on a few cardiac parameters in the anaesthesized dog.

| Examined parameters | Units | Basal | A | B | C |
|---|---|---|---|---|---|
| Heart frequency | beats /min. | 200 | 197 | 164*** | 159*** |
| Ave. arterial pressure | mmHg | 97 | 66*** | 87 | 52** |
| Ave. coronaric resistance | Pressure (mmHg) flux (ml) | 2.07 | 1.15** | 2.161* | 1.37** |
| Heart work | 1/atm/min | 0.186 | 0.116** | 0.161 | 0.064*** |

*$P < 0.05$
**$P < 0.01$
***$P < 0.001$

2 - In the Tables 2 and 3 there are reported the data as obtained on the awake dog, under the action of isoproterenol, and after administration by the oral route of 1-(o-methoxy)-3-isopropylamino-propane-2-ol (B) as such and in long acting formulation, on the coronaric flux and on the cardiac frequency in time. It can be observed that while the substance as such dissolved in water ceases its activity after 180 minutes, the one in the retard type preparation maintains its activity till beyond 420 minutes.

TABLE 2

Activity of the compound B and the compound B-retard on the increase of the coronaric flux caused by isoproterenol on awake dog.

| PRODUCTS | Reduction % with respect to the starting value, after administration of isoproterenol at the times (minutes): | | | | |
|---|---|---|---|---|---|
| | 30' | 60' | 180' | 300' | 420' |
| Compound B | 95.8 | 87.0 | 35.7 | — | — |
| Compound B-retard | 83.8 | 86.0 | 94.0 | 62.7 | 36.2 |

TABLE 3

Activity of the compound B and the compound B-retard on the increased cardiac frequency caused by isoproterenol on the awake dog.

| PRODUCTS | Reduction with respect to the starting value, after administration of isoproterenol in % at the times (minutes): | | | | |
|---|---|---|---|---|---|
| | 30' | 60' | 180' | 300' | 420' |
| Compound B | 84.8 | 74.6 | 40 | — | — |
| Compound B-retard | 62 | 70 | 84 | 81 | 35 |

3 - In Table 4 there are reported the data in time as obtained in the awake dog on the parameter cardiac work after administration of nitroglycerine as such and nitroglycerine in long acting formulation. Also in this case it can be seen that the activity of the long acting formulation is prolonged beyond 180 minutes while at that time nitroglycerine alone has finished its action.

TABLE 4

Cardiac work in the awake dog after administration of nitroglycerine.

| PRODUCTS | 0 mins. | Cardiac work (liters/atm. minute after administration of the product at the times (minutes): (basal) | 30' | 120' | 180' |
|---|---|---|---|---|---|
| Nitroglycerine (A) | | 0.288 | 0.260 | 0.264 | 0.278 |
| Nitroglycerine (A) | retard | 0.316 | 0.274 | 0.205 | 0.187 |

4 - In the Table 5 there are summarized the trends in time of the average arterial pressure values, the coronaric resistances (average) and the cardiac work in the awake dog after oral administration of 1-(o-methoxy-phenoxy)-3-isopropylamino-propane-2-ol in the long acting form and of the same associated with nitroglycerine also in long acting form in the same proportions of the preparation according to the present invention.

As can be observed in all the times which have been examined and on all three considered parameters, the preparation with the long acting association of the two drugs is statistically and significantly different and is always more advantageous from the therapeutical standpoint than the adrenergic beta-blocking agent alone in the retard form.

12 percent higher than that after administration of placebo, after the administration of the compound C the frequency was equal to that after the administration of placebo. After the exercise, the frequency was slightly higher in the treatments with nitroglycerine than in those with placebo, while in the cases treated with the compound B and compound C the reduction of the frequency was the same with an average of 25 beats per minute. On the inschaemic ecg alterations the depression of the ST segment was, respectively: 3.2 millimeters after administration of placebo; 1.9 millimeters after administration of nitroglycerine; 1.6 millimeters after administration of the compound B and 0.4 millimeters after administration of the compound C of the invention. On the tolerance of stress the increase of tol-

TABLE 5

Variations in time (expressed as % variations with respect to the values of the basal 0 time) of a few haemodynamic parameters after the administration by the oral route in not anaesthesized dogs of the B products in long acting formulation and of the same in association with nitroglycerine (Compound C), still in long acting formulation.

| UNDER SCRUTINY | PRODUCTS | TIMES IN HOURS AFTER ADMINISTRATION OF THE PRODUCTS | | | | | | |
|---|---|---|---|---|---|---|---|---|
| | | 1 | 2 | 3 | 4 | 5 | 6 | 7 |
| Ave. arterial pressure | B long-acting | +2.2 | −1.1 | −1.1 | −1.1 | −6.6 | −6.6 | −4.4 |
| | C | −10.9** | −13*** | −10.9** | −10.9* | −9.8** | −9.8*** | −8.7** |
| Ave. coronaric resistance | B long-acting | +12 | +2.7 | −0 | +4 | −0 | +4.9 | +4.2 |
| | C | −16.7* | −25* | −18.5* | −11.5* | −11** | −11.2 | −12.3* |
| Cardiac work | B long-acting | −4.3 | −8.6 | −5 | −3.9 | −9.8 | −9.8 | −8.6 |
| | C | −12.2* | −21.5** | −21.5** | −22* | −21* | −22* | −17* |

CLINICAL TESTS

On twentyfour patients suffering from angina, who were in special need of frequent administrations of nitroglycerine, especially after a stress, a test was made with stress tests (Master scale) after the administration of placebo, compound B in retard formulation, nitroglycerine in retard form and the union of the two, compound C in retard form.

The results were: On the angina pair during the standard exercise nitroglycerine along prevented the pain in 8 of the 24 patients and diminished the gravity of the pain in 14 patients. The compound B in retard form prevented the pain in 6 patients and diminished the gravity of the pain in 18 patients. The compound C protected all of the 24 patients which did not feel any incommodity during the stress test and thereafter. On the heart frequency prior to the excercise with the patient stretched out after administration of the compound B the frequency was less than 20 percent as compared with that obtained after the administration of placebo, whereas after the administration of nitroglycerine was erance of stress with the individual components (A,B) was about 24 percent with respect to the treatment with placebo whereas after the administration of the compound C it was over 76 percent. Continuous therapy all of the 24 patients were kept under survey for a period of continuous treatment (2 or 3 capsules daily) of 2 months. A surprising alleviation of the symptoms were obtained and the tolerance was extremely high.

What is claimed is:

1. A pharmaceutical composition for the treatment of coronary insufficiency comprising from 10 to 50 milligrams of the beta adrenergic receptor blocking agent 1-(o-methoxy-phenoxy)-3-isopropylamino-propane-2-ol hydrochloride and from 0.5 to 2.5 milligrams of nitroglycerine.

2. The pharmaceutical composition of claim 1 wherein the ratio of said blocking agent to nitroglycerine is 10 to 1.

* * * * *

UNITED STATES PATENT OFFICE
CERTIFICATE OF CORRECTION

Patent No. 3,911,136      Dated October 7, 1975

Inventor(s) Giorgio Ferrari

It is certified that error appears in the above-identified patent and that said Letters Patent are hereby corrected as shown below:

In the heading insert --Claims priority of

Italian application No. 23843A/73 filed May 8, 1973--

Signed and Sealed this twenty-third Day of March 1976

[SEAL]

Attest:

RUTH C. MASON
*Attesting Officer*

C. MARSHALL DANN
*Commissioner of Patents and Trademarks*